United States Patent
Cowton

(10) Patent No.: US 7,452,592 B2
(45) Date of Patent: Nov. 18, 2008

(54) COATED FILMS AND COATING COMPOSITIONS COMPRISING BIOPOLYMER NANOPARTICLES

(75) Inventor: Lucy Cowton, Cumbria (GB)

(73) Assignee: Innovia Films Limited, Cumbria (GB)

( * ) Notice: Subject to any disclaimer, the term of this patent is extended or adjusted under 35 U.S.C. 154(b) by 193 days.

(21) Appl. No.: 10/416,274

(22) PCT Filed: Nov. 12, 2001

(86) PCT No.: PCT/EP01/13067

§ 371 (c)(1), (2), (4) Date: Jan. 30, 2004

(87) PCT Pub. No.: WO02/40579

PCT Pub. Date: May 23, 2002

(65) Prior Publication Data

US 2004/0115424 A1    Jun. 17, 2004

(30) Foreign Application Priority Data

Nov. 15, 2000  (GB) ................................. 0027876.2

(51) Int. Cl.
*B32B 5/16* (2006.01)

(52) U.S. Cl. ................... 428/323; 428/326; 428/327

(58) Field of Classification Search ................ None
See application file for complete search history.

(56) References Cited

U.S. PATENT DOCUMENTS

| | | | | |
|---|---|---|---|---|
| 3,462,283 A | * | 8/1969 | Kirby et al. | 106/206.1 |
| 5,055,541 A | * | 10/1991 | Floyd et al. | 527/300 |
| 5,182,130 A | * | 1/1993 | Haralampu et al. | 427/2.14 |
| 5,314,754 A | * | 5/1994 | Knight | 428/532 |
| 5,840,825 A | | 11/1998 | Carlblom et al. | 528/183 |
| 5,981,029 A | * | 11/1999 | Harada et al. | 428/143 |
| 6,040,379 A | * | 3/2000 | Luebke et al. | 524/734 |
| 6,677,386 B1 | * | 1/2004 | Giezen et al. | 516/31 |
| 6,755,915 B1 | * | 6/2004 | Van Soest et al. | 127/65 |

FOREIGN PATENT DOCUMENTS

| | | |
|---|---|---|
| EP | 0 818 508 | 1/1998 |
| WO | 97/47694 | 12/1997 |
| WO | 00/40404 | 7/2000 |

* cited by examiner

*Primary Examiner*—Monique R Jackson
(74) *Attorney, Agent, or Firm*—Wenderoth, Lind & Ponack, L.L.P.

(57) ABSTRACT

There is described a substantially planar self-supporting sheet (preferably an thermoplastic film e.g. formed from a polyolefin such as BOPP) comprising on at least one side thereof a substantially continuous adherent coating, thereon to create a barrier to oxygen, the coating comprising nano-particles, the sheet characterized in that: (a) the nano-particles form a substantially continuous phase on the sheet; and/or (b) the nano-particles are present in an amount of at least about 20% by dry weight of the coating; and/or (c) the coating is substantially free of polymeric binder, synthetic hydrophilic resin and/or a resin with a hydrophilic/hydrophobic character. The coated sheets have a high oxygen barrier, with preferred OTR values (at 23° C. and 0% RH)<10 $cm^3/m^2$/day. Preferred nano-particles are biopolymers such as starch and the coating is preferably substantially free of wax which has been found to reduce oxygen barrier effectiveness. Coatings components of small molecules or oligomers such as biomonomers (e.g. sucrose) have also been found to enhance oxygen barrier properties of a particulate coat whether the particles are micrometer or nanometer sized. Coating compositions, coated films, coating processes and packaged articles are also described.

16 Claims, No Drawings

COATED FILMS AND COATING COMPOSITIONS COMPRISING BIOPOLYMER NANOPARTICLES

The present invention relates to improved coating compositions and films coated with such compositions, the coated films having properties such as a low permeability to gases (high gas barrier).

One important use of films is in the packaging of perishable items such as food. It is desirable in this and other applications that packaging film provides a good barrier to gases such as oxygen. However many commonly used film substrates such as polyolefins (e.g. polypropylene) do not provide good gas barrier properties. Therefore it is often desirable to add various coatings to a film to enhance or provide desired properties depending on the end use of the film.

Current coatings used to provide an improved oxygen barrier to a film comprise materials such as polyvinylidene chloride (PVdC). However this material is expensive and as it contains halogen is undesirable for environmental reasons. For example films coated with PVdC are more difficult to recycle. If PVdC coated film is incinerated suitable means must be provided to eliminate the generation of dioxins. Chlorine containing packaging materials (such as PVdC coated film) are consequently less favoured in some countries.

Therefore it is desirable to find alternative gas-barrier coatings which solve some or all of the properties of prior art coatings and preferably which give comparable or improved properties to the film compared to conventional coatings.

Starch dispersions have previously been used as coating compositions, e.g. to coat paper. Starch dispersions refer to aqueous starch systems where the granular starch structure has partly or totally been disrupted using sufficient work or heat. In excess of water, the process of starch hydration and granule destruction is known as gelatinisation and can be facilitated or impeded by chemical modifications (cf. converted, derivatised or cross-linked starch) ("Starch: Chemistry and Technology", R. L. Whistler, J. N. BeMiller, E. F. Paschall Eds., Academic Press, London, 1984). Pre-gelatinisation and physical treatment (e.g. via extrusion, drum- or spray drying) of starch (and derivatives) yields cold-water dispersible systems. Although there is no need for cooking, pre-gelatinised starch still requires substantial mechanical energy for dispersion in water. U.S. Pat. No. 5,032,683 describes the production of a stable aqueous starch composition having a coatable viscosity, wherein the starch has been gelatinised and reacted at temperatures above 70° C. in the presence of a blocked glyoxal compound. However, converted (thin-boiling) and/or chemically modified starch are the advised starch materials for these compositions. U.S. Pat. No. 5,116,890 describes the preparation of water-dispersible, self cross-link lattices based on a starch hydrolysate to produce stable emulsions with low viscosity. The process requires undesirable chemicals and is quite laborious.

Blends of starch and synthetic polymers obtained via thermoplastic processing, are also well-known in the art ("Production of Thermo-Bioplastics and Fibers based mainly on Biological Materials", H.-G. Fritz, T. Seidenstücker, U. Bölz and M. Juza, EU-Study AGRE-0200-DE, 1994). These materials are usually developed for the production of moulded or shaped articles, not for the preparation of latex compositions for coating purposes. Numerous patents describe the destructure of starch in combination with hydrophilic and hydrophobic synthetic components, such as vinyl alcohol copolymers (EP 327505, EP 408503), polyvinylesters and polyesters (EP 327565, U.S. Pat. No. 5,439,953), aliphatic polyesters (WO 92/19680), polyolefins (WO 92/20740), ethylene acrylic acid (EM) copolymer (U.S. Pat. No. 4,133,784, U.S. Pat. No. 5,262,458). U.S. Pat. No. 5,262,458, describes a starch/EAA blend where after processing part of the destructured starch (<30% of total starch in the mixture) comprises particles with diameter lower than 1 micrometer.

A co-pending application PCT/NLOO/00050 by ATO-DLO (published on 23 Nov. 2000 after the priority date of the present application) describes a new thermo-mechanical process for the production of cross-linked biopolymer (such as starch) using extrusion at raised temperatures and under conditions of high shear and high pressure. This thermo-mechanical treatment is conducted in the presence of a cross-linking agent and preferably a plasticiser is also present. The starch material obtained can readily be dispersed in cold water at increased solids content (up to 40% by weight), and has relatively low viscosity (typically lower than 100 mPa.s at 25° C. and 10% by weight) compared to other cold-water dispersible starches. The average size of these dispersed starch particles is in the submicron size range, typically less than 200 nm. One of over twenty different possible uses listed for such nano-particles is to provide an high barrier coating for oxygen, although films are not mentioned as a possible substrate. This document has no more than a passing reference to use of these particles in an oxygen barrier coating and no specific coating formulations or coated films are described therein. There is no disclosure in this document of how the nanoparticles may be formulated in practise to coat films which may exhibit high oxygen barrier properties.

The applicant's co-pending patent application PCT/EP00/10503 describes dispersions of these new nano-sized biopolymers (e.g. starch) in combination with synthetic hydrophilic resins and/or resins with a hydrophilic/hydrophobic character to impart the necessary stability. One use of such dispersions is stated to be as coatings with a high oxygen barrier, although this reference also states that in the absence of these resin additives, the nano-starch is unsuitable for coating applications. This leads a skilled reader directly away from the present invention which uses nano-starch to form a coating on a film where such synthetic resins are not an essential element of the coating. No coated films are described in this document.

As well as being inventive the specific films and coating compositions of the present invention are clearly novel with respect to the separate disclosures in either of the previous two unpublished co-pending applications.

WO 00/40404 (Mobil) describes thermoplastic films which are coated with a composition comprising a polymeric binder within which are dispersed nano-sized particles. Such coatings are said to act as a barrier for water and oxygen. The specific nano-particles described therein comprise inorganic material such as silicate clays and are added to the coating in the form of a thermoplastic additive compositions such that the coating contains no more than 18% by weight of nanoparticles.

The applicant has developed improved coating compositions and coated films which comprise nano-sized particles (preferably of nano-sized biopolymer). The applicant has discovered methods of preparing films with such coatings such that the film has the desired barrier properties. The absence and/or presence of certain ingredients in preferred coatings of the invention has unexpectedly been found to lead to improved oxygen barrier properties.

Therefore broadly in accordance with the present invention there is provided a substantially planar self-supporting sheet comprising on at least one side thereof a substantially continuous adherent coating thereon to create a barrier to oxygen, the coating comprising nano-particles, the sheet characterised in that:

(a) the nano-particles form a substantially continuous phase on the sheet; and/or
(b) the nano-particles are present in an amount of at least about 20% by dry weight of the coating; and/or
(c) the coating is substantially free of a polymeric binder, synthetic hydrophilic resin and/or a resin with a hydrophilic/hydrophobic character.

Conveniently the coating of the present invention comprises the nano-particles as substantial proportion thereof; preferably in amount of at least about 90%, more preferably about 95%; most preferably at least about 98% by weight of the dry coating. It is preferred that such proportions of nano-particles in the coating exclude any amounts of gas barrier improving additives that may be added, but include only the relative proportion by weight in the coat of nano-particles with respect to other (non gas-barrier improving) additives. It is especially preferred that the coating of the present invention is substantially free of any additives which are detrimental to the gas barrier properties of the coating.

Conveniently the coating is substantially free of any components which act to reduce the effectiveness of the coating as an oxygen barrier.

Preferably a coated sheet of the invention has an oxygen transfer rate (OTR measured at 23° C. and 0% relative humidity) of less than about 10 $cm^3/m^2/day$, more preferably less than about 5 $cm^3/m^2/day$; more preferably less than about 3 $cm^3/m^2/day$.

It will be appreciated that the coatings of the invention use a material which has advantages over prior art coatings, such as one or more of the following: kinder to the environment; use of a renewal resource; and/or more cost effective than prior art coatings (e.g. PVOH, EVOH or PVdC). Coatings of the present invention are preferably chlorine free, more preferably halogen free, can be used as a replacement for prior art barrier coatings (such as PVdC) to prepare films having comparable OTR values to the prior art. But the coatings of the invention have an improved OTR for a given coat weight compared to PVdC and so (especially when in combination with the oxygen barrier improving additives described herein) films having greatly improved OTR values also can be prepared. Thus particularly preferred films of the invention have an OTR less than about 1 $cm^3/m^2/day$; in particular less than about 0.5 $cm^3/m^2/day$.

As used herein the term "nano-particle" and/or "nano-sized particle" denote particles whose mean size is less than about 500 nm (0.5 microns). Preferably the nano-particles used herein have a mean particle size less than about 300 nm; more preferably from about 5 nm to about 300 nm; most preferably from about 10 nm to about 200 nm; for example from about 10 nm to about 100 nm; in particular from about 20 nm to about 80 nm; e.g. about 50 nm.

Particle size as measured and described herein denotes in a linear dimension [e.g. measured in nanometers (1 nanometer≡1 nm≡1 mμ≡1×10$^{-9}$ m) which is the mean diameter of particles assuming an approximate spherical shape or the mean length of the major axis for particles of non-spherical shape. Preferably the particle size distribution is unimodal, narrow, substantially symmetrical and/or Gaussian, although it could also be for example bimodal and/or skewed. More preferably the nano-particles used herein comprise no more than about 30%, most preferably no more than about 10% of particles having a size greater than about one micron (1 micron≡1 μ≡1 μm≡1×10$^{-6}$ m).

Particle size herein can be determined by any convenient technique. For example dynamic light scattering (DLS) can be a useful tool to measure the average size and the size distribution of the particles in a coating of the present invention. Light scattering measurements can be performed at 25° C. on a MALVERN Autosizer Io-C instrument equipped with a 8-bit correlator. If a tolerable scattered light signal can be measured, samples can be diluted with de-mineralised water to a concentration lower than 0.1% by weight. At higher concentrations, it can be verified that multiple scattering and concentration (interparticle interactions) effects are insignificant for the estimated particle sizes. The time-correlation function of the scattered light intensity may be recorded at an angle of 90° (usually in triplicate). The intensity correlation data may be analysed with the so-called "CONTIN" software package (S. W. Provencher, Comput. Phys. Commun. 27, 1982) to assess particle size distributions and the average particle size. Diameter estimation from DLS data is inherently intensity-weighted (i.e. weighted to the sixth power of the diameter). Preferably the particle size is measured shortly after the particles are made, for example using the methods described herein.

Conveniently the nano-particles used herein are formed from materials other than: silica, silicate, clay, organomontmorillonite, calcium carbonate, calcined aluminium silicate, hydrated aluminium silicate, calcium phosphate, alumina, barium sulphate, magnesium sulphate and/or diatomacious earth.

Both coatings of the present invention and formulations used to prepare coated sheets of the present invention (e.g. aqueous dispersions of nano-particles) may conveniently comprise other than a thermoplastic and/or thermoset additives and are preferably substantially free of any synthetic thermoplastic and/or thermoset binder resins. The coatings and formulations of the present invention may also comprise at least about 20% (preferably≧about 90%) of the nano particles by weight.

The nano-particles used to form the films and coatings of the present invention may comprise (advantageously are formed substantially from) one or more organic polymers, preferably biopolymers, more preferably selected from carbohydrates; polysaccharides (such as starch, cellulose, glycogen, hemi-cellulose, chitin, fructan inulin; lignin and/or pectic substances); gums; proteins, optionally cereal, vegetable and/or animal proteins (such as gluten [e.g. from wheat], whey protein, and/or gelatin); colloids (such as hydro-colloids, for example natural hydrocolloids, e.g. gums); effective mixtures thereof; and/or effective modified derivatives thereof. More conveniently, the biopolymer comprises native and/or modified starch obtained and/or obtainable from one or more plant(s); most conveniently a starch, starch-ether, starch-ester and/or oxidised starch obtained and/ or obtainable from one or more root(s), tuber(s) and/or cereal(s), preferably obtained and/or obtainable from potato, waxy maize, tapioca and/or rice.

Gluten may comprise a mixture of two proteins, gliadin and glutenin whose amino acid composition may vary although glutamic acid and proline usually predominate.

Gums are natural hydro-colloids which may be obtained from plants and are typically insoluble in organic solvents but form gelatinous or sticky solutions with water. Gum resins are mixtures of gums and natural resins.

As used herein the term carbohydrate will be understood to comprise those compounds of formula $C_x(H_2O)_y$, which may be optionally substituted. Carbohydrates may be divided into saccharides (also referred to herein as sugars) which typically may be of low molecular weight and/or sweet taste and/or polysaccharides which typically may be of high molecular weight and/or high complexity.

Polysaccharides comprise any carbohydrates comprising one or more monosaccharide (simple sugar) units. Homopolysaccharides comprise only one type of monosaccharide and heteropolysaccharides comprise two or more different types of sugar. Long chain polysaccharides may have molecular weights of up to several million daltons and are often highly branched, examples of these polysaccharides comprise starch, glycogen and cellulose. Polysaccharides also include the more simple disaccharide sugars, trisaccharide sugars and/or dextrins (e.g. maltodextrin and/or cyclodextrin).

It is preferred that if polysaccharides comprise the biopolymers used herein, then the polysaccharides comprise a polymer of at least twenty or more monosaccharide units and more preferably have a molecular weight ($M_w$) of above about 5000 daltons. It will be appreciated that the less complex polysaccharides (such as oligosaccharides, disaccharide sugars, trisaccharide sugars, maltodextrins and/or cyclodextrins) may be more suitable for use as barrier improving additives in the coatings of the present invention rather than forming the nanoparticles themselves. This is described more fully later on.

Non-limiting examples of more complex polysaccharides are listed below and one or more of these polysaccharides may be used as barrier improving additive and/or biopolymer in the present invention as appropriate.

Starch (which occurs widely in plants) may comprise various proportions of two polymers derived from glucose: amylose (comprising linear chains comprising from about 100 to about 1000 linked glucose molecules) and amylopectin (comprising highly branched chains of glucose molecules).

Glycogen (also known as animal starch) comprises a highly branched polymer of glucose which can occur in animal tissues.

Cellulose comprises a long unbranched chain of glucose units.

Chitin comprises chains of N-acetyl-D-glucosamine (a derivative of glucose) and is structurally very similar to cellulose.

Fructans comprise polysaccharides derived from fructose which may be stored in certain plants.

Inulin comprises a polysaccharide made from fructose which may be stored in the roots or tubers of many plants.

Lignin comprises a complex organic polymer that may be deposited within the cellulose of plant cell walls to provide rigidity.

Pectic substances such as pectin comprise polysaccharides made up primarily of sugar acids which may be important constituents of plant cell walls. Normally they exist in an insoluble form, but may change into a soluble form (e.g. during ripening of a plant).

Polylactic and/or polygalactic polymers and the like comprise those polymeric chains and/or cross-linked polymeric networks which are obtained from, obtainable from and/or comprise: polylactic acid; polygalactic acid and/or similar polymers and which may be made synthetically and/or sourced naturally.

Other types of polysaccharide derivatives one or more of which may also be used to form (in whole or in part) nanoparticles as used in the present invention may comprise any effective derivative of any suitable polysaccharide (such as those described herein) for example those derivatives selected from, amino derivatives, ester derivatives (such as phosphate esters) ether derivatives; and/or oxidised derivatives (e.g. acids).

Advantageously the biopolymer particles are prepared by a mechanical thermoplastic process. Thermoplastic processing as used in this context means a thermo-mechanical treatment, which is in particular an extrusion treatment performed at elevated temperature (preferably above about 40° C., more preferably up to about 140° C.) under conditions of high shear and high pressure (preferably from about 5 to about 150 bar). The shear can be effected by applying at least about 500 J of specific mechanical energy per gram of biopolymer. The elevated temperature can be moderated, in case of starch, by using an alkaline medium or by using pre-gelatinised starch. During the thermo-mechanical treatment, the biopolymer may be present in high concentration, especially a weight concentration of at least 40%, more preferably at least 50%, in an aqueous solvent, such as water or a water/alcohol mixture.

It is preferred that a plasticiser is present during the thermoplastic process described above. The plasticiser may be selected from one or more: polyols, ethyleneglycol, propyleneglycol, polyglycol, glycerol, sugar alcohols, urea and/or citric acid esters. The plasticiser may be present in an amount from about 5% to about 40% by weight of the biopolymer. A lubricant, such as lecithin, other phospholipids and/or monoglycerids, may also be present, for example in an amount from about 0.5% to about 2.5% by weight of the biopolymer.

Particularly preferred nano-particles of biopolymer for use in the films and compositions of the present invention are those where the biopolymer has been cross-linked for example during the thermo-mechanical treatment described herein. Any convenient, effective cross-linker can be used, but usefully cross-linkers such as epichlorohydrin and other epoxides, dialdehydes (e.g. glutaraldehyde, glyoxal), triphosphates and/or divinyl sulphone, can be used to cross-link polysaccharide biopolymers, while dialdehydes, thiol reagents and the like may be used to cross-link proteinaceous biopolymers. Glyoxal is a particularly suitable cross-linker. The cross-linking reaction may be acid- or base catalysed. The cross-linking agent can conveniently be present in an amount from about 0.1% to about 10% by weight of the biopolymer.

After the thermo-mechanical treatment, the biopolymer can readily be dissolved or dispersed in an aqueous medium to a concentration from about 4% to about 40% by weight. This results in a dispersion of starch nano-particles, which are characterised by an average particle size as specified herein, which is preferably less than about 200 nm.

Preferably the coating comprises substantially none (or less than a gas barrier reducing amount) of any component which is capable of substantially reducing the gas barrier (preferably oxygen barrier) properties of the coatings of the present invention when applied to a film.

Preferably gas barrier inhibiting components which are to be substantially excluded from the coatings of the present invention may comprise one or more of those organic compounds and/or polymers which comprise linear carbon chains of greater than 10 carbon atoms, preferably $C_{16-44}$ chains, more preferably natural or synthetic waxes.

The total amount of gas barrier inhibiting component(s) which can act to substantially reduce the oxygen barrier effectiveness of the nano-particle coat of the present invention may be a variable amount depending on the undesirable ingredient. Conveniently preferred films of the invention are those coated with a nano-particle composition which is about 90% free, more preferably about 95% more preferably about 98% free of gas barrier inhibiting components (such as any of those described herein). It will be appreciated that for maximum oxygen barrier effectiveness coatings of the invention may be substantially completely free of such components. However as a compromise if other properties are desired in the coating some otherwise undesirable ingredients may be added in small amounts just sufficient to improve and/or impart the desired properties to the coating and/or film. For example some waxes (preferably no more than about 5%) may be added to a gas barrier coating of the invention for other reasons without destroying the gas barrier properties to a significant extent.

Preferably those gas barrier inhibiting component(s) to be avoided are natural or synthetic wax(es), especially if present in a total amount greater than or equal to about 10% by weight of the coating. Up to about 5% preferably up to about 4%, more preferably about 2% of wax may be acceptable. Particularly undesirable in the coating of the invention are 10% or more by weight of waxes with a melting point from about 50° C. to about 150° C. such as montan ester waxes (m.p. from about 60° C. to about 90° C.); carnauba waxes (m.p. from about 60° C. to about 90° C.); and/or polyethylene waxes (m.p. about 130° C.).

Preferably a coating of the present invention also comprises an oxygen barrier improving amount of a component which acts to improve the oxygen barrier properties of the nano-particle coat when applied to a film.

Gas barrier improving components may comprise those having one or more of the following selected properties:

small polymers and/or oligomers having a short chain length such than the mean number of repeat units in the oligomer and/or polymer chain is less than or equal to about 20;

mean molecular weight ($M_w$) less than about 4,000; preferably<about 1,000, more preferably less than about 500 and for example about 350 daltons;

chemical and/or physical compatibility with the particles in the coat to aid close packing thereof;

components having combinations more than one of these properties in the same component; and/or mixtures of different components with at least one of these properties.

The total amount of gas barrier improving component(s) which can be added to the coating composition substantially to improve the gas (preferably oxygen) barrier effectiveness of the nano-particle coat may be significant compared to the amount of nano-particles. Without wishing to be bound by any theory it is believed that in general up to an upper limit the more of the gas-barrier improving additive that is added to the coat the better the close packing of the particles and thus the better the gas barrier. Effective total amounts of gas barrier improving ingredients may therefore be from about 10% to about 99%, preferably from about 20% to about 95%, more preferably from about 40% to about 90% by weight of the total coating.

Barrier improving components to be preferred (especially when the particles in the coating comprise biopolymer) comprise those constituent monomers and/or oligomers from which biopolymers may be made (biomonomers). Barrier improving components may comprise suitable bio derived monomers, dimers, trimers and/or oligomers. Conveniently the barrier improving ingredient may comprise: dextrins (such as maltodextrins and/or cyclodextrins); low molecular weight hydroxy compounds (such as glycerol); low molecular weight carbohydrates (such as saccharides and/or sugars) and/or any effective mixtures and/or combinations thereof.

Saccharides comprise monosaccharides (also known as simple sugars) and/or polysaccharides (some of which are also known as complex sugars). Complex sugars typically comprise from two to twenty (preferably from 2 to 10) monosaccharide units linked together (such as disaccharides, trisaccharides, maltodextrins and/or cyclodextrins). It will be appreciated that one or more of any simple and/or complex sugar (optionally substituted) may be used as barrier improving additives in the present invention.

Monosaccharides (or simple sugars) comprise carbohydrates that cannot be split into smaller units by the action of dilute acids. Monosaccharides may be classified according to the number of carbon atoms they possess (such as trioses, tetroses, pentodes, hexoses etc); may also be characterised into aldoses (sugars comprising a aldehyde group) and ketoses (sugars comprising a ketone group); can exist as either straight-chain or ring-shaped molecules; and can also exist in different enantiomeric forms. Monosaccharides can be oxidised to yield sugar acids and react with phosphoric acid to produce phosphate esters.

Non-limiting examples of simple sugars are listed below; and one or more of these sugars may be used as gas-barrier improving additives in the present invention.

Fructose (also known as fruit sugar; laevulose) is a ketohexose, a stereoisomer of glucose, which occurs naturally as the d-enantiomer.

Furanose has a five-membered ring containing four carbon atoms and one oxygen atom.

Galactose occurs naturally as one of the products of the enzymic digestion of milk sugar (lactose) and is a constituent of gum arabic.

Glucose (also known as dextrose or grape sugar) is a white crystalline aldohexose of formula $C_6H_{12}O_6$, occurring widely in nature which is optically active like other monosaccharides (most natural occurring glucose being dextrorotatory).

Mannose is a stereoisomer of glucose, that occurs naturally only in polymers called mannans found in plants, fungi, and bacteria.

Mannitol is a polyhydric alcohol, $CH_2OH(CHOH)_4CH_2OH$, derived from mannose or fructose.

Pyranose has a six-membered ring containing five carbon atoms and one oxygen atom.

Non limiting examples of disaccharides are listed below, and one or more of these sugars also may be used as barrier improving additives in the present invention.

Lactose (also known as milk sugar) comprises one glucose molecule linked to a galactose molecule.

Maltose (also known as malt sugar) comprises two linked glucose molecules and results from the action of the enzyme amylase on starch.

Sucrose (also known as cane sugar, beet sugar or saccharose) comprises one molecule of glucose linked to a fructose molecule.

Non limiting examples of other polysaccharides (such as oligosaccharides) are listed below, and one or more of these also may be used as barrier improving additives in the present invention.

Maltodextrin comprises dextrins of up to about twenty glucose units and has a typical $M_w$ of about 3,600.

Cyclodextrin comprises dextrins of about eight glucose units which together form a ring.

Other types of derivatives of the above compounds one or more of which may also be used as gas-barrier improving additives in the present invention comprise: amino sugars; sugar esters (such as phosphate esters); sugar ethers; and/or oxidised sugar derivatives (e.g. sugar acids). Amino sugars comprise a sugar containing an amino group in place of a hydroxyl group, for example hexosamines are amino derivatives of hexose sugars and include glucosamine (based on glucose) and galactosamine (based on galactose).

Preferred sugars and sugar derivatives used as gas-barrier improving additives in the present invention are those compounds having from one to twenty (inclusive), more preferably one to eight monosaccharide units per molecule. Mono- and/or di-saccharides; are most preferred such as fructose, glucose and/or sucrose.

Advantageously the barrier improving component may be present in the form of an encapsulate for example within a miscelle formed by polymer chains. Such encapsulates may be usefully formed by any convenient method such as spray or freeze drying of the appropriate ingredients.

Without wishing to be bound by any mechanism it is believed that the barrier improving component acts to aid packing of the particles in the coating giving a more compressed coating layer which acts as a better barrier to oxygen molecules. For example components of short chain length (e.g. sucrose) more really fill the interstices and voids between the particles (e.g. biopolymer nano-particles).

Although nano-particles are preferred in combination with the barrier improving component it can be seen from the data herein that barrier improving components can also be used in compositions having larger particles (greater than nano sized) to improve the oxygen barrier properties.

Therefore broadly in accordance with another aspect of the present invention there is provided a substantially planar self supporting sheet comprising on at least one side thereof a substantially continuous adherent coating thereon to create a barrier to oxygen, the coating comprising nano and/or micro-sized particles; the sheet characterised in that: the coating further comprises, in an gas-barrier (preferably oxygen-barrier) improving amount, a gas-barrier improving component (such as any of those described herein) which acts to enhance the gas barrier properties of the coating. Optionally particles of just nano-size are preferred as are those particles which comprise biopolymer such one or more of those described herein.

As used above the term "micro-particle" denote particles whose mean size is from about 1 micron to about 100 microns and preferably has less than about 20% of the particles of a size below about one micron. Preferred particles used in this aspect of the present invention are those of nano-size, such as described herein.

Unless the context indicates otherwise, the terms 'effective' and/or 'suitable' as used herein (for example with reference to the sheets, films, coatings, formulations, process, methods, uses, applications, products, materials, additives, compounds, monomers, oligomers, polymer precursors, polymers and/or resins described herein and/or used in, added to and/or incorporated in the present invention) will be understood to refer to those components which if used in the correct manner provide the required properties (such as an improved gas-barrier) to the present invention as described herein.

It will also be understood that any optional substituents that may be present on any repeat unit in any polymer described herein may be selected to improve the compatibility thereof with any other materials with which they may be formulated and/or incorporated to form the invention herein.. Thus, the size and length of substituents may be selected to optimise the physical entanglement or interlocation with the resin or they may or may not comprise other reactive entities capable of chemically reacting and/or cross-linking with such resins.

Certain moieties, species, groups, repeat units, compounds, oligomers, polymers, materials, mixtures, compositions and/or formulations which comprise some or all of the invention as described herein may exist as one or more stereoisomers (such as enantiomers, diastereoisomers, geometric isomers, tautomers and/or conformers), salts, zwitterions, complexes (such as chelates, clathrates, crown compounds, cyptands/cryptades, inclusion compounds, intercalation compounds, interstitial compounds, ligand complexes, non-stoichiometric complexes, organometallic complexes, π-adducts, solvates and/or hydrates); isotopically substituted forms, polymeric configurations [such as homo or copolymers, random, graft or block polymers, linear or branched polymers (e.g. star and/or side branched polymers), hyperbranched polymers and/or dendritic macromolecules (such as those of the type described in WO 93/17060), cross-linked and/or networked polymers, polymers obtainable from di and/or tri-valent repeat units, dendrimers, polymers of different tacticity (e.g. isotactic, syndiotactic or atactic polymers)]; polymorphs [such as interstitial forms, crystalline forms, amorphous forms, phases and/or solid solutions] combinations thereof where possible and/or mixtures thereof. The present invention comprises and/or incorporates all such forms which are effective and/or suitable.

It is appreciated that certain features of the invention, which are for clarity described in the context of separate embodiments may also be provided in combination in a single embodiment. Conversely various features of the invention, which are for brevity, described in the context of a single embodiment, may also be provided separately and/or in any suitable sub-combination.

The term "comprising" as used herein will be understood to mean that the list following is non-exhaustive and may or may not include any other additional suitable items, for example one or more further feature(s), component(s), ingredient(s) and/or substituent(s) as appropriate.

The sheet used in the present invention, prior to deposition of any coating (e.g. the gas barrier-coating of the present invention) and/or layer may be any suitable substrate, such as any well known sheeting material(s). Suitable sheeting materials may comprise any of the following: paper, synthetic paper, woven fabric, non-woven fabric, ceramic sheet, metallic fibre sheet, metallised sheet or film, metallic foil, metallic plate; films made from biopolymers such as any of those described herein [preferably polylactic, polygalactic and/or cellulosic films (e.g. microbal and/or regenerated cellulose film)]; thermoplastic films; polymeric films (for example films comprising: polyolefins [e.g. polypropylene and/or polyethylene] polyurethanes, polyvinylhalides [e.g. PVC], polyesters [e.g. polyethylene terephthalate—PET], polyamides [e.g. nylons] and/or non-hydrocarbon polymers); and/or multilayer and/or composite sheets formed by any suitable combinations and/or mixtures of thereof. Advantageously sheets of the present invention are other than paper and/or are chlorine-free, more advantageously halogen free.

Preferably the sheet comprises a cellulosic material, polymeric material and/or thermoplastic polymer, conveniently comprising polymers of low surface energy. More preferably the sheet comprises a homopolymer, a crystalline polymer and/or a polymer of randomly oriented amorphous non-crystalline polymer chains. Most preferably the sheet comprises: polyolefins [e.g. polypropylene and/or polyethylene] polyurethanes, polyvinylhalides [e.g. polyvinyl chloride (PVC)], polyesters [e.g. polyethylene terephthalate—PET], polyamides [e.g. nylons] and/or non-hydrocarbon polymers).

Conveniently the polyolefin films to be used with the present invention may comprise one or more polyolefins [e.g. polypropylene homopolymer, polyethylene homopolymer (e.g. linear low-density polyethylene—LLDPE) and/or polypropylene/polyethylene copolymer(s); optionally in one or more layers]. The constituent polymers and/or layers in a film of the present invention may be oriented, blown, shrunk, stretched, cast, extruded, co-extruded and/or comprise any suitable mixtures and/or combinations thereof. Preferred films comprise a major proportion of polypropylene and/or an olefin block copolymer containing up to about 15% w/w of the copolymer of at least one copolymerisable olefin (such as ethylene). More preferred films comprise polypropylene homopolymer, most preferably isotactic polypropylene homopolymer. Films may optionally be cross-linked by any suitable means such as electron beam (EB) or UV crosslinking, if necessary by use of suitable additives in the film.

The definition of polyolefin, as intended herein, is a polymer assembled from a significant percentage, preferably $\geq 50\%$ by weight of one or more olefinic monomers. The definition of copolymer herein, is a polymer assembled from two or more monomers. Such polymers may include, but are not limited to, polyethylene homopolymers, ethylene-$\alpha$-olefin copolymers, polypropylene-$\alpha$-olefin copolymers, polypropylene homopolymers, ethylene-vinyl acetate copolymers, ethylene-methacrylic acid copolymers and their salts, ethylene-styrene polymers and/or blends of such polymers. The polymers may be produced by any suitable means, for example one or more of free radical polymerisation (e.g. peroxy compounds), metallocene catalysis and/or coordination catalysis (e.g. Ziegler and/or Natta catalysts and/or any variations thereof).

Polymeric resins used to produce the films of the present invention are generally commercially available in pellet form and may be melt blended or mechanically mixed by well-known methods known in the art, using commercially available equipment including tumblers, mixers and/or blenders. The resins may have other additional resins blended therewith along with well-known additives such as processing aids and/or colorants. Methods for producing polyolefin films are well-known and include the techniques of casting films as thin sheets through narrow slit dies, and blown-film techniques wherein an extruded tube of molten polymer is inflated to the desired bubble diameter and/or film thickness.

For example to produce a polymeric film the resins and additives may be introduced into an extruder where the resins are melt plastified by heating and then transferred to an extrusion die for formation into a film tube. Extrusion and die temperatures will generally depend upon the particular resin being processed and suitable temperature ranges are generally known in the art or provided in technical bulletins made available by resin manufacturers. Processing temperatures may vary depending upon process parameters chosen.

A film of the present invention may be oriented by stretching at a temperature above the glass transition temperature ($T_g$) of its constituent polymer(s). The resultant oriented film may exhibit greatly improved tensile and stiffness properties. Conveniently a film comprising a propylene homopolymer is oriented at a temperature within a range of from about 145° to 165° C. Orientation may be along one axis if the film is stretched in only one direction, or may be biaxial if the film is stretched in each of two mutually perpendicular directions in the plane of the film. A biaxial oriented film may be balanced or unbalanced, where an unbalanced film has a higher degree of orientation in a preferred direction, usually the transverse direction. Conventionally the longitudinal direction (LD) is the direction in which the film passes through the machine (also known as the machine direction or MD) and the transverse direction. (TD) is perpendicular to MD. Preferred films are oriented in both MD and TD.

Orientation of the film may be achieved by any suitable technique. For example in the bubble process the polypropylene film is extruded in the form of a composite tube which is subsequently quenched, reheated, and then expanded by internal gas pressure to orient in the TD, and withdrawn, at a rate greater than that at which it is extruded, to stretch and orient it in the MD. Alternatively a flat film may be oriented by simultaneous or sequential stretching in each of two mutually perpendicular directions by means of a stenter, or by a combination of draw rolls and a stenter. A preferred oriented film comprises biaxially oriented polypropylene (known herein as BOPP), more preferably the BOPP film described in EP 0202812.

The degree to which the film substrate is stretched depends to some extent on the ultimate use for which the film is intended, but for a polypropylene film satisfactory tensile and other properties are generally developed when the film is stretched to between three and ten, preferably, seven or eight, times its original dimensions in each of TD and MD.

After stretching, the polymeric film substrate is normally heat-set, while restrained against shrinkage or even maintained at constant dimensions, at a temperature above the $T_g$ of the polymer and below its melting point. The optimum heat-setting temperature can readily be established by simple experimentation. Conveniently a polypropylene film is heat-set at temperatures in the range from about 100° C. to about 160° C. Heat-setting may be effected by conventional techniques for example by means one or more of the following: a stenter system; one or more heated rollers (e.g. as described in GB 1124886) and/or a constrained heat treatment (e.g. as described in EP 023776).

The film may comprise a major proportion of polypropylene such as isotactic polypropylene homopolymer, but also may comprise coextruded multilayer films where the polymer of at least one layer is isotactic polypropylene homopolymer, and the polymer of one or both outer layers is a surface layer polymer having different properties to the isotactic polypropylene homopolymer.

The sheet of the present invention may consist of only one layer, or the sheet may be multi-layered i.e. comprise a plurality of layers. The layers can be combined by lamination or co-extrusion. Preferably the sheet comprises at least three layers where at least one layer(s) are sandwiched between other layers such that none of such sandwiched layer(s) form either surface of the sheet.

Thus for example a film of the invention may comprise a three layer film where the polymer of a central or core layer comprises one polymeric material. The core layer may have a thickness of about 90 to about 98% of the total thickness of the film. The remainder of such a three layer film may comprise two outer layers of another polymeric material, with each outer layer having substantially identical thickness.

Another film of the present invention may comprise a coextruded five layer film comprising a central core layer, two layers contiguous to the central core layer and two outermost layers, where the central core layer and such contiguous layers comprise one polymeric material and the two outer layers comprise another polymeric material. Preferably the central core layer has a thickness from about 70% to about 96%, more preferably from about 76% to about 90%, of the total thickness of the film. Preferably each of such contiguous layers has substantially the same thickness, which is more preferably from about 1% to about 6%, most preferably from about 1% to about 2%, of the total thickness of the film. Preferably each outer layer has substantially the same thickness, which is more preferably from about 1% to about 6%, most preferably from about 1% to about 2%, of the total thickness of the film.

A film of the invention may also be made by lamination of two coextruded films

One or more layers of the films of the present invention may be opaque or transparent depending on the end use of the film. Such layers may also comprise voids introduced by stretch orienting such a layer containing spherical particles of a material higher melting than and immiscible with the layer material (e.g. if the layer comprises isotactic polypropylene homopolymer, then such particles may be, polybutylene terephthalate, as shown, for example, in U.S. Pat. Nos. 4,632,869 and 4,720,716).

Multiple-layer films of the invention may be prepared in a range of thicknesses governed primarily by the ultimate application for which a particular film is to be employed. For general use films, having a mean thickness from about 2.5 μm to about 150 μm, preferably from about 4 μm to about 100 μm are suitable. For certain applications, such as packaging, preferred films have a mean thickness of from about 10 μm to 50 μm, most preferably from about 8 μm to about 40 μm.

If desired, before coating a sheet of the present invention (e.g. with a gas barrier coating of the present invention and/or any other coating and/or layer) may be subjected to a chemical or physical surface-modifying treatment to ensure that the coating and/or layer will better adhere to the sheet thereby reducing the possibility of the coating peeling or being stripped from the sheet. Known prior art techniques for surface pre-treatment prior to coating comprise, for example: film chlorination, i.e., exposure of the film to gaseous chlorine; treatment with oxidising agents such as chromic acid, hot air or steam treatment; flame treatment and the like. A preferred treatment, because of its simplicity and effectiveness, is the so-called electronic treatment in which the sheet is passed between a pair of spaced electrodes to expose the sheet surface to a high voltage electrical stress accompanied by corona discharge. Optionally if even adhesion of the coating is desired an intermediate continuous coating of a primer medium and/or anchor coating can be applied to a sheet surface treated by any of the methods described herein. Primer materials may comprise titanates and poly(ethylene imine) and may be applied as conventional solution coatings [such as poly(ethylene imine) applied as either an aqueous or organic solvent solution, e.g. in ethanol comprising about 0.5 wt. % of the imine]. Another primer medium comprises the interpolymerised condensation acrylic resins prepared in the presence of a $C_{1-6}$alkanol as described in either: GB 1134876 (condensing a monoaldehyde with an interpolymer of acrylamide or methacrylamide with at least one other unsaturated monomer); or in GB 1174328 (condensing a monoaldehyde with acrylamide or methacrylamide, and subsequently interpolymerising the condensation product with at least one other unsaturated monomer).

In addition to the gas barrier coatings of the present invention that are described herein, one or more other layers may be applied to a coated sheet of the invention. Such other layers may conveniently contain any of the additives and/or coatings conventionally employed in the manufacture of sheets and such additives and/or coatings may be added for more than one effect and/or for similar purposes. It is also possible that some of these other additives listed below may be directly incorporated in the gas-barrier coatings of the present invention provided that such additives are not present in amounts which would substantially inhibit or destroy the gas barrier properties of the coating. However it is generally preferred that the gas barrier coatings of the invention are substantially free (preferably 90% free) of any ingredients other than the nano-particles and any optional gas barrier improving ingredients.

Such additives and/or coatings may be selected from one or more of the following ingredients, mixtures thereof and/or combinations thereof, given below.

Additives may comprise: dyes; pigments, colorants; metallised and/or pseudo-metallised coatings (e.g. aluminium); lubricants, anti-oxidants, surface-active agents, stiffening aids, gloss-improvers, prodegradants, UV attenuating materials (e.g. UV light stabilisers); sealability additives; tackifiers, anti-blocking agents, additives to improve ink adhesion and/or printability, cross-linking agents (such as melamine formaldehyde resin); adhesive layer (e.g. a pressure sensitive adhesive); and/or an adhesive release layer (e.g. for use as the backing material in the peel plate method for making labels).

Further additives comprise those to reduce coefficient of friction (COF) such as a terpolymer described in U.S. Pat. No. 3,753,769 which comprises from about 2% to about 15% w/w of acrylic or methacrylic acid, from about 10% to about 80% w/w of methyl or ethyl acrylate, and from about 10% to about 80% w/w of methyl methacrylate, together with colloidal silica and carnauba wax.

Still further additives comprise slip aids such as hot slip aids or cold slip aids which improve the ability of a film to satisfactorily slide across surfaces at about room temperature for example micro-crystalline wax. Preferably the wax is present in the coating in an amount from about 0.5% to about 5.0% w/w, more preferably from about 1.5% to about 2.5% w/w. The wax particles may have an average size conveniently from about 0.1 μm to 0.6 μm, more conveniently from about 0.12 μm to abut 0.30 μm.

Yet further additives comprise conventional inert particulate additives, preferably having an average particle size of from about 0.2 μm to about 4.5 μm, more preferably from about 0.7 μm to about 3.0 μm. Decreasing the particle size improves the gloss of the film. The amount of additive, preferably spherical, incorporated into the or each layer is desirably in excess of about 0.05%, preferably from about 0.1% to about 0.5%, for example, about 0.15%, by weight. Suitable inert particulate additives may comprise an inorganic or an organic additive, or a mixture of two or more such additives. Suitable particulate inorganic additives include inorganic fillers such as talc, and particularly metal or metalloid oxides, such as alumina and silica. Solid or hollow, glass or ceramic micro-beads or micro-spheres may also be employed. A suitable organic additive comprises particles, preferably spherical, of an acrylic and/or methacrylic resin comprising a polymer or copolymer of acrylic acid and/or methacrylic acid and/or a $C_{1-6}$ester thereof. Such resins may be cross-linked, for example by the inclusion therein of a cross-linking agent, such as a methylated melamine-formaldehyde resin. Promotion of cross-linking may be assisted by the provision of appropriate functional groupings, such as hydroxy, carboxy and amido groupings, in the acrylic and/or methacrylic polymer.

Yet still further additives comprise fumed silica for the purpose of further reducing the tack of a coating at room temperature. The fumed silica is composed of particles which are agglomerations of smaller particles and which have an average particle size of, for example, from about 2 μm to about 9 μm, preferably from about 3 μm to about 5 μm, and is present in a coating in an amount, for example, from about 0.1% to about 2.0% by weight, preferably about 0.2% to about 0.4% by weight.

It is contemplated that in some instances, the coatings used in the present invention should have the additional benefit of aiding or enhancing the properties of other conventional additives and/or coatings used on the same film. Thus two or more different coatings may exhibit the same or similar properties.

Some or all of the desired additives listed above may be added together as a composition to coat the sheet of the present invention and/or form a new layer which may itself be coated (i.e. form one of the inner layers of a final multi-layered sheet) and/or may form the outer or surface layer of the sheet. Alternatively some or all of the preceding additives may be added separately and/or incorporated directly into the bulk of the sheet optionally during and/or prior to the sheet formation (e.g. incorporated as part of the original polymer composition by any suitable means for example compounding, blending and/or injection) and thus may or may not form layers or coatings as such. These conventional other coatings and/or layers may thus be provided on top of or underneath the gas barrier coatings of the present invention and may be in direct contact thereto or be separated by one or more other intermediate layers and/or coats.

If the film of the present invention comprises a polymer if possible it is preferred that conventional additives are added to the polymer resin before the film is made instead of applying it as a coating or other layer. The incorporation of the blend into the resin is less expensive, less labour intensive, and more consistent than coatings applied to the surface of the film. If the additive is added to the resin, the mixing of the additives into the resin is done by mixing it into molten polymer by commonly used techniques such as roll-milling, mixing in a Banbury type mixer, or mixing in an extruder barrel and the like. The mixing time can be shortened by mixing the additives with unheated polymer particles so as to achieve substantially even distribution of the agent in the mass of polymer, thereby reducing the amount of time needed for intensive mixing at molten temperature. The most preferred method is to compound the additives with resin in a twin-screw extruder to form concentrates which are then blended with the resins of the film structure immediately prior to extrusion.

Formation of a film of the invention (optionally oriented and optionally heat-set as described herein) which comprises one or more additional layers and/or coatings is conveniently effected by any of the laminating or coating techniques well known to those skilled in the art.

For example a layer or coating can be applied to another base layer by a coextrusion technique in which the polymeric components of each of the layers are coextruded into intimate contact while each is still molten. Preferably, the coextrusion is effected from a multi-channel annular die such that the molten polymeric components constituting the respective individual layers of the multi-layer film merge at their boundaries within the die to form a single composite structure which is then extruded from a common die orifice in the form of a tubular extrudate.

A film of the invention may also be coated with one or more of the additives described herein using conventional coating techniques from a solution or dispersion of the additive in a suitable solvent or dispersant. An aqueous latex, (for example prepared by polymerising polymer precursors of a polymeric additive) in an aqueous emulsion in the presence of an appropriate emulsifying agent is a preferred medium from which a polymeric additive or coating may be applied.

Coatings and/or layers (including those gas barrier coatings of the present invention) may be applied to either or both surfaces of the sheet. The or each coating and/or layer may be applied sequentially, simultaneously and/or subsequently to any or all other coatings and/or layers. If a gas-barrier coating of the present invention is applied to only one side of the sheet (which is preferred) other coatings and/or layers may be applied either to the same side of the sheet and/or on the reverse (other) side of the sheet.

A coating composition may be applied to the treated surface of sheet (such as the polymer film) in any suitable manner such as by gravure printing, roll coating, rod coating, dipping, spraying and/or using a coating bar. Solvents, diluents and adjuvants may also be used in these processes as desired. The excess liquid (e.g. aqueous solution) can be removed by any suitable means such as squeeze rolls, doctor knives and/or air knives. The coating composition will ordinarily be applied in such an amount that there will be deposited following drying, a smooth, evenly distributed layer having a thickness of from about 0.02 to about 10 microns, preferably from about 1 to about 5 microns. In general, the thickness of the applied coating is such that it is sufficient to impart the desired characteristics to the substrate sheet. Once applied to the sheet a coating may be subsequently dried by hot air, radiant heat or by any other suitable means to provide a sheet of the present invention with the properties desired (such as an optionally clear; optionally substantially water insoluble; highly oxygen impermeable coated film useful, for example in the fields of packaging, labelling and/or graphic art).

It would also be possible to use combinations of more than one of the above methods of applying additives and/or components thereof to a film. For example one or more additives may be incorporated into the resin prior to making the film and the one or more other additives may be coated onto the film surface.

Other aspects of the present invention and preferred features thereof are also described in the claims.

The invention is now further illustrated by reference to the following non-limiting Examples.

Nano-Starch Coating Formulations

Formulation (i) Potato Starch

A nano-particle dispersion of extrusion modified potato starch can be prepared as follows. A mixture of native potato starch (moisture content 18%) and glycerol (in a respective weight ratio of 21 to 4) was blended in a mixer at room temperature until homogenous. The mixture was fed at the rate of 8.4 kg per hour, into a twin screw extruder set at a screw speed of 160 rpm. The extruder had nine zones with an adjusted temperature profile of 20-80-90-100-100-100-100-100-95° C. An aqueous solution of glyoxal (5% by weight) was injected into the fifth zone via a piston dosing pump at a flow rate of 1.2 kg per hour, to give 1% of pure glyoxal per weight of dry starch. The mixture was extruded through a five hole die (hole diameters 3 mm) and the extrudate granulated. The granules were cryogenically ground. The resultant powder was passed through a 100 to 200 micron polyester sieve to remove that particle size fraction having too large a particle size, and 10 g of the fine powder was mixed with 90 g of water and the mixture was shaken at room temperature to form a strong gel. The gel was allowed to collapse after time to form a homogeneous, transparent, light brown dispersion of low viscosity, the average particle size of which was determined by dynamic light scattering (DLS) to be 10 nm or larger.

Formulation (ii) Waxy Maize Corn Starch

A nano-particle dispersion of extrusion modified corn starch obtained from waxy maize may be prepared as described in method (i) above where the native potato starch is replaced by the same proportion of a corn starch from a waxy maize.

For the coatings used to prepare films Comp A to D, 10% of the relevant wax was also added to the relevant dispersion before it was used to coat the film.

If necessary up to 0.2% of potassium sorbate can be added to any of these starch dispersions as an anti-microbial agent and to increase the storage stability of the dispersions by up to one month. This additive does not significantly effect the OTR results generated herein. If the cryogenic grinding step is omitted the starch dispersion (otherwise prepared as described herein) is denoted as "raw" starch.

These nano-starch dispersions once prepared are used (preferably immediately) in the method described below to prepare the coated films tested herein.

Coating Method

Coated films of the invention (Examples 1 to 19) and comparative examples Comp A to D were prepared by coating a base film with a dispersion (freshly prepared as described above). Each of the films prepared and tested herein by the applicant have a pre-coat of a conventional primer applied (using yellow bar no 1—see Table 1) to the corona treated surface of the base film so the subsequently applied barrier coatings would better adhere to the film surface.

Details of the film and coating used for each example are given below and in the Tables. The films were coated using a model No K303 RK Multicoater with a bar coating head having a spiral wire around the outside of the bar which acts to dispense a coating formulation onto a substrate surface. Selecting different bars will alter the coating thickness. The characteristics of the bars used to prepare the examples herein are as follows.

TABLE 1

(coating bars)

| Standard coating bar for K303 | Wet film deposit | Wire size | Used to prepare examples |
|---|---|---|---|
| No 1 (Yellow) | 0.00025" = 6 micron | 0.003" (0.08 mm) | Primer only |
| No 2 (Red) | 0.0005" = 12 micron | 0.006" (0.16 mm) | 6, 8, 9, 11[1], 12[1], 13[2], 14[2] & Comp A to D |
| No 3 (Green) | 0.001" = 24 micron | 0.012" (0.31 mm) | 2, 3, 4, 7, 13[3], 14[3], 15[4], 16 & 17 |
| No 4 (Black) | 0.0015" = 40 micron | 0.020" (0.51 mm) | 1, 5 & 10, |

Footnotes

1 Overcoated film—No 2 (red) bar used to draw down both the nano-starch coating and then the overcoat onto the film
2 Overcoated film—No 2 (red) bar used to draw down the overcoat onto the film coated with nano-starch
3 Overcoated film—No 3 (green) bar used to draw down the nano-starch coating onto the film.
4 Overcoated film—No 3 (green) bar used to draw down both the nano-starch coating and then the overcoat onto the film Prior Art Films Various prior art films were made and tested by the applicant as described herein, or data was used from published sources.

Comp A to D, and Examples 1 to 10; 13 to 15 and 17 to 19 herein, were prepared and tested by the applicant using various coating compositions on a base film of conventional clear BOPP film of 58 micron thickness and 18.9 $m^2 kg^{-1}$ yield (corona discharge treated on the side to be coated) such as that available commercially from UCB Films under the trade mark Rayoface C58. Examples 11, 12 and 16 herein were prepared using an otherwise identical treated film of 50 micron thickness and 22.0 $m^2 kg^{-1}$ yield available commercially from UCB Films under the trade mark Rayoface C50.

It is believed that to a first order approximation using as different substrates uncoated film of similar type (e.g. different grades of BOPP) and/or of different film thickness has little or no effect on the oxygen barrier properties of the final film, which are dependent much more on the properties of the barrier coating used. Thus the OTR data of Mobil 1 to 5 (25.4 micron thick film) and the PVdC film (32 micron) can be validly compared with the OTR data on C50 and C58 base film generated herein by the applicant. The OTR value for the uncoated C50 and C58 base film used in the examples herein also given in Table 1 for comparison.

Mobil 1 to 5—Coatings of Silica Nano-Particles in Binder Resin

Mobil 1 to Mobil 5 denotes those prior art BOPP films coated with nano-particles of organomontmorillonite clay in an ethylene acrylic acid copolymer as binder resin, described and tested as described in WO 00/40404 page 8 to 9, Table 2. Mobil 1 to 5 in Table 1 correspond to examples SC96-034 to 038 respectively. For ease of comparison the data in Table 1 have been converted from the units quoted in the Mobil reference: i.e. coat weight from g/msi [$\equiv g(in)^{-2} \times 10^{-3}$] to $gm^{-2}$ and OTR from $cc/100/in^2/day/mil$ [$\equiv cc(645.2 \text{ cm})^{-2}(0.00254 \text{ cm})^{-1} day^{-1}$] to $(cm)^3 m^{-2} day^{-1}$. The OTR data in Mobil 1 to 5 were stated to have been normalised for a standard BOPP film of 25.4 micron thickness.

Conventional PVdC Coated Film

For comparison the table also includes OTR data for a conventional barrier coated film of clear BOPP of 32 micron thickness and 32.5 $m^2 kg^{-1}$ yield and coated on both sides with PVdC. This is the film available commercially from UCB Films under the trade designation RX32.

Comp 1 to 6—Coatings of Micron Sized Starch

Comp 1 is a C58 base film coated with an oxypropylated maize starch (available from Amylum) which has been extruded after derivatisation to form starch particles of average size above one micron.

Comp 2 is a C58 base film coated with a conventional gum arabic particles of average size above one micron and available commercially from Aldrich Chemicals.

Comp 3 is a C58 base film coated with a potato starch of conventional micron particle size, the starch being that used to prepare Formulation (i) herein, but before its treatment by the thermo-mechanical process as described herein to form nano-sized particles.

Comp 4 is a C58 base film coated with a modified waxy maize corn starch (available from Amylum) cross-linked prior to extrusion to form starch particles of average size above one micron.

Comp 5 is a C58 base film coated with a maize starch which is soluble cold water and of conventional micron particle size (less than 20% of the particles being above 100 microns) and is available commercially from Roquette under the trade name Pregeflo.

Comp 6 is a C58 base film coated with the starch used in Comp 1 together with 15% by weight in the coating of as a cross-linker the glyoxal available commercially from Clairant under the trade name Cartabond TSI.

Comp A to D—Coatings of Nano-sized Starch with 10% Wax

Comp A is a C58 base film coated as described herein (with reference to Tables 1 and 2 herein) with the cryogenically ground waxy maize corn starch of Formulation (ii) described herein (90% by dry weight) together with (10% by dry weight) of a conventional polyethylene wax (such as that available commercially from Omya).

Comp B is a C58 base film coated with the composition of Comp A where the polyethylene wax was replaced by the same amount of a carnauba wax available commercially from Omya under the trade name Michemiube ML160.

Comp C is a C58 base film coated with the composition of Comp A where the polyethylene wax was replaced by the same amount of a montan wax available commercially from Clariant under the trade designation KPS emulsified with a suitable surfactant.

Comp D is a C58 base film coated with the composition of Comp A where the polyethylene wax was replaced by the same amount of a paraffin wax.

Test Results

The oxygen transfer rate (OTR) for each film at various temperatures and relative humidities (RH) are given in Table 2 below. When tested by the applicant the test method used to measure OTR was that standard method described in ASTM D1432 (with, where necessary the temperature and RH of the test conditions changed as specified in Table 2).

TABLE 2

Prior Art Films

| Example | Coat weight in $gm^{-2}$ | Oxygen transfer rate [OTR] in $(cm)^3 m^{-2} (24\,hr)^{-1}$ | | |
|---|---|---|---|---|
| (bar) | | 23° C., 0% RH | 23° C., 50% RH | 23° C., 70% RH |
| Uncoated OPP films. | | | | |
| C50 | No coat | 1,039.97 | No data | No data |
| C58 | No coat | 1,041.01 | No data | No data |
| PVdC coated OPP film (RX32) | | | | |
| PVdC | ≈2.5 | 15 | No data | 20 |
| Silica nano-particles in binder resin | | | | |
| Mobil 1 | 0.78 | 1473 | No data | No data |
| Mobil 2 | 0.89 | 1209 | No data | No data |
| Mobil 3 | 1.04 | 713 | No data | No data |
| Mobil 4 | 1.28 | 434 | No data | No data |
| Mobil 5 | 1.42 | 140 | No data | No data |
| Micron sized starch | | | | |
| Comp 1 | ≈1 | 89.76 | No data | 380.89 |
| Comp 2 | ≈1 | 54.94 | No data | 557.47 |
| Comp 3 | ≈1 | 164.01 | No data | 650.31 |
| Comp 4 | ≈1 | 250.29 | No data | 630.48 |
| Comp 5 | ≈1 | 100.18 | No data | 470.08 |
| Comp 6 | ≈1 | 79.77 | No data | 538.97 |
| Nano-starch plus 10% wax | | | | |
| Comp A | ≈1.8 | 40.39 | 132.87 | 413.47 |
| Comp B | ≈1.8 | 55.13 | 81.24 | 372.99 |
| Comp C | ≈1.8 | 145.33 | 174.13 | 550 |
| Comp D | ≈1.8 | 33.15 | 60.95 | 495.31 |

Films Coated with Nano-Starch

Various films of the present invention were made and tested by the applicant as described herein.

EXAMPLES 1 to 5

Coatings of Nano-Sized Potato Starch

Examples 1 to 3 are C58 base film coated as described herein (with reference to Tables 1 and 3 herein) with the cryogenically ground potato starch of Formulation (i) described herein.

Examples 4 and 5 are C58 base film coated as described herein (with reference to Tables 1 and 3 herein) with the raw potato starch of Formulation (i) described herein.

EXAMPLES 6 to 10

Coatings of Nano-Sized Waxy Maize Corn Starch

Examples 6 to 10 are C58 base film coated as described herein (with reference to Tables 1 and 3 herein) with the cryogenically ground waxy maize corn starch of Formulation (ii) described herein; except Example 9 used this starch raw (i.e. not cryogenically ground).

EXAMPLES 11 to 15

Overcoated Nano-Starch Coatings

Example 11 is C58 base film coated as described herein (with reference to Tables 1 and 3 herein) with the cryogenically ground waxy maize corn starch of Formulation (ii) described herein, and then further coated at a coat weight of ≈1 $gm^{-2}$ with an overcoat of an aqueous dispersion comprising 15% by weight of the acrylic copolymers available commercially from UCB Chemicals under the trade designation WB 1240.

Example 12 is C58 base film coated as described herein (with reference to Tables 1 and 3 herein) with the cryogenically ground waxy maize corn starch of Formulation (ii) described herein, and then further coated at a coat weight of ≈1 $gm^{-2}$ with an overcoat of an aqueous dispersion comprising 25% by weight of the polyester available commercially from SK Chemicals or UCB Chemicals under the trade designation EW110.

Example 13 is C58 base film coated as described herein (with reference to Tables 1 and 3 herein) with the cryogenically ground potato starch of Formulation (i) described herein, and then further coated at a coat weight of≈1 $gm^{-2}$ with an overcoat of an aqueous dispersion comprising 15% by weight of the polyester available commercially from SK Chemicals or UCB Chemicals under the trade designation EW100.

Example 14 is C50 base film coated as described herein (with reference to Tables 1 and 3 herein) with the cryogenically ground potato starch of Formulation (i) described herein, and then further coated at a coat weight of≈1 $gm^{-2}$ with an overcoat of an aqueous dispersion comprising 15% by weight of the acrylic copolymers available commercially from UCB Chemicals under the trade designation WB 1240.

Example 15 is C58 base film coated as described herein (with reference to Tables 1 and 3 herein) with the cryogenically ground potato starch of Formulation (i) described herein, and then further coated at a coat weight of ≈1 $gm^{-2}$ with an overcoat of an aqueous dispersion comprising 27% by weight of the polyester available commercially from SK Chemicals or UCB Chemicals under the trade designation EW100.

Test Results

The oxygen transfer rate (OTR) for each film at various temperatures and relative humidities (RH) are given in Table 3 below. Compared to the prior art films it can be seen that the OTR values of nano starch coated films of the invention in the absence of binder resins are much lower (i.e. coatings of the invention are much better oxygen barriers) than either the prior art conventional PVdC coated barrier film, the Mobil films which use inorganic nano-particles in a thermoplastic polymer binder or films coated with micron sized starch.

TABLE 3

Films of the invention - nano starch

| Example | Coat weight/ gm$^{-2}$ | OTR/(cm)$^3$m$^{-2}$ day$^{-1}$ 23° C. 0% RH | 23° C. 30% RH | 23° C. 50% RH | 23° C. 70% RH |
|---|---|---|---|---|---|
| Nano-starch (potato starch) | | | | | |
| 1 | ≈2 | 4.29 | 10.9 | 15.52 | No data |
| 2 | ≈1.7 | 2.8 | 15.4 | 21.63 | No data |
| 3 | 2.2 to 2.4 | 0.66 | No data | 24.35 | 418.84 |
| 4 | 1.9 | 1.8 | No data | 31.54 | 442.59 |
| 5 | 3.9 | 0.84 | No data | 12.41 | 166.68 |
| Nano-starch (waxy maize corn starch) | | | | | |
| 6 | ≈1.4 | 3.85 | 11.93 | 18.25 | No data |
| 7 | ≈1.7 | 1.5 | 12.09 | 7.5 | 19.52 |
| 8 | 1.8 | 1.74 | No data | 32.76 | 379.71 |
| 9 | ≈1.7 | 2.43 | No data | 36.21 | 393.15 |
| 10 | 6.5 | 4.44 | No data | 40.44 | 411.81 |
| Nano starch plus overcoat | | | | | |
| 11 | 1.4 | 2.29 | 13.97 | 18.76 | 27.1 |
| 12 | 1.4 | 1.46 | 9.64 | 16.11 | 27.05 |
| 13 | 2.22 | 2.9 | No data | 7.79 | 364.16 |
| 14 | 2.06 | 2.04 | No data | 19.24 | 428.08 |
| 15 | 2.32 | 1.65 | No data | 15.69 | 173.24 |

Films Coated with Starch Plus Sucrose Additive

Various other films of the present invention were made and tested by the applicant as described herein.

EXAMPLES 16 to 17

Coatings of Nano-Sized Starch with Sucrose

Example 16 is a C50 base film coated as described herein (with reference to Tables 1 and 4 herein) with the cryogenically ground potato starch of Formulation (i) described herein to which sucrose has been added in a weight ratio of dry ingredients of 9 to 1 (starch to sucrose).

Example 17 is a C50 base film coated as described herein (with reference to Tables 1 and 4 herein) with the cryogenically ground potato starch of Formulation (i) described herein to which sucrose has been added in a weight ratio of dry ingredients of 7 to 3 (starch to sucrose).

EXAMPLES 18 to 19

Coatings of Micron-Sized Starch with Sucrose

Example 18 is a C58 base film coated as described herein (with reference to Tables 1 and 4 herein) with an oxypropylated maize starch which has been extruded after derivatisation which forms starch particles of average size above one micron (that used in Comp 1 herein) to which sucrose has been added in amount of 30% by weight of dry ingredients.

Example 19 is a C58 base film coated as described herein (with reference to Tables 1 and 4 herein) with the micron sized starch of Comp 1 herein, together with 15% of a glyoxal cross-linker (that available commercially from Clariant under the trade name Cartabond TSI) and 30% of sucrose (amounts by weight of dry ingredients).

Test Results

The oxygen transfer rate (OTR) for each film at various temperatures and relative humidities (RH) are given in Table 4 below. As a further aspect of the invention it can be seen that adding sucrose (even to a coating of conventional micron-sized starch) leads to a greatly enhanced oxygen barrier (compared with OTR data for the micron-sized starch coatings Comp 1 to 6 in Table 2).

TABLE 4

Films of the invention - sucrose additive

| Example | Coat weight/ gm$^{-2}$ | OTR/(cm)$^3$m$^{-2}$ day$^{-1}$ 23° C. 0% RH | 23° C. 30% RH | 23° C. 50% RH | 23° C. 70% RH |
|---|---|---|---|---|---|
| Nano starch plus sucrose | | | | | |
| 16 | ≈2.5 | 0.31 | No data | 18.68 | 593.31 |
| 17 | ≈2.5 | 0.36 | No data | 3.85 | 582.89 |
| Micron-sized starch plus sucrose | | | | | |
| 18 | ≈1 | 23.03 | No data | No data | 424.17 |
| 19 | ≈1 | 22.62 | No data | No data | 469.63 |

The invention claimed is:

1. A substantially planar self-supporting sheet comprising on at least one side thereof a substantially continuous adherent coating thereon to create a barrier to oxygen, the coating comprising biopolymer nanoparticles in an amount of at least 20% by dry weight of the coating, forming a substantially continuous phase on the sheet, said biopolymer nanoparticles obtained from a mechanical thermoplastic process comprising a cross-linking step using a cross-linking agent.

2. The coated sheet as claimed in claim 1, in which the coating further comprises, in an oxygen barrier improving amount, an oxygen barrier improving component which acts to enhance the oxygen barrier properties of the nanoparticle coat.

3. The coated sheet as claimed in claim 2, in which the oxygen barrier improving component has one or more of the following selected properties:
   small polymers and/or oligomers having a short chain length such that the mean number of repeat units on the oligomer and/or polymer chain is less than or equal to about 20;
   mean molecular weight ($M_w$) less than about 1000;
   chemical and/or physical compatibility with the particles in the coat to aid close packing;
   components having combinations of more than one of these properties in the same component; and/or
   mixtures of different components with at least one of these properties.

4. The coated sheet as claimed in claim 2, in which the oxygen barrier improving component comprises one or more constituent monomers, dimers, trimers and/or oligomers from which biopolymers may be made.

5. The coated sheet as claimed in claim 4, in which the oxygen barrier improving component is selected from one or more of: dextrin, maltodextrin and/or cyclodextrin; low molecular weight hydroxy compound; low molecular weight carbohydrates and/or any effective mixtures and/or combinations thereof.

6. The coated sheet as claimed in claim 5, in which the low molecular weight hydroxy compound is glycerol.

7. The coated sheet as claimed in claim 2, in which the barrier improving component is present in a total amount from about 10% to about 99% by weight of the coating.

8. The coated sheet as claimed in claim 7, in which the oxygen barrier improving component is present in a total amount from about 20% to about 95% by weight of the coating.

9. The coated sheet as claimed in claim 8, in which the oxygen barrier improving component is present in a total amount from about 40% to about 90% by weight of the coating.

10. The coated sheet according to 1, in which the sheet comprises a cellulosic material, polymeric material and/or thermoplastic polymer.

11. The coated sheet according to claim 10, in which the sheet comprises a polyolefin, polyurethane, polyester, polyamide and/or non-hydrocarbon polymer and which is optionally oriented in at least one direction.

12. Packaging for an article, the packaging comprising a coated sheet as claimed in claim 1.

13. An article packaged with packaging as claimed in claim 12.

14. A label and/or graphic art display comprising a coated sheet as claimed in claim 1.

15. An article comprising a label and/or graphic art display as claimed in claim 14.

16. The coated sheet as claimed in claim 1, in which the coating is substantially free of polymeric binder, synthetic hydrophilic resin and/or a resin with a hydrophilic/hydrophobic character.

* * * * *